United States Patent [19]
Aiston

[11] Patent Number: 5,964,427
[45] Date of Patent: Oct. 12, 1999

[54] SEAT BELT MECHANISM

[75] Inventor: Brian Edward Aiston, Carlisle, United Kingdom

[73] Assignee: Breed Automotive Technology, Inc., Lakeland, Fla.

[21] Appl. No.: 09/000,485
[22] PCT Filed: May 30, 1997
[86] PCT No.: PCT/GB97/01472
  § 371 Date: Jul. 30, 1998
  § 102(e) Date: Jul. 30, 1998
[87] PCT Pub. No.: WO97/46428
  PCT Pub. Date: Dec. 11, 1997

[30] Foreign Application Priority Data

Jun. 4, 1996 [GB] United Kingdom ............... 96 11 605

[51] Int. Cl.[6] ........................................... B60R 22/44
[52] U.S. Cl. ............................................ 242/372
[58] Field of Search ............................. 242/372, 375.3; 280/807, 806; 297/475–478

[56] References Cited

U.S. PATENT DOCUMENTS

| | | | |
|---|---|---|---|
| 3,984,063 | 10/1976 | Knieriemen | 242/372 |
| 4,081,153 | 3/1978 | Tanaka et al. | 242/372 |
| 4,113,201 | 9/1978 | Ziv | 242/372 |
| 4,183,476 | 1/1980 | Fohl | 242/372 |
| 4,215,830 | 8/1980 | Cunningham | 242/372 |
| 4,383,658 | 5/1983 | Morita et al. | 242/372 |
| 4,749,141 | 6/1988 | Young | 242/372 |
| 5,165,621 | 11/1992 | Mizuno et al. | 242/372 |
| 5,558,293 | 9/1996 | Hirase et al. | 242/372 |
| 5,775,618 | 7/1998 | Krambeck | 242/372 |

FOREIGN PATENT DOCUMENTS

| | | |
|---|---|---|
| 0411738 | 2/1991 | European Pat. Off. . |
| 2358902 | 2/1978 | France . |
| 1560258 | 1/1980 | United Kingdom . |
| 2123271 | 2/1984 | United Kingdom . |

*Primary Examiner*—John M. Jillions
*Attorney, Agent, or Firm*—Markell Seitzman

[57] ABSTRACT

The present invention provides for a seat belt mechanism comprising a spool from which a seat belt (1) is to be unwound, resilient means arranged to act on said spool to rewind said belt thereon, said resilient means comprising a first resilient member (8) and a second resilient member (13) arranged to exert a return force on said spool which is less than the return force exerted on said spool by said first resilient member (8) means (12, 15, 17, 19, 21) inhibiting the return force of said first resilient member (8) during initial rewinding of said spool so that said second resilient member (13) provides the primary return force for the spool, and wherein said first (8) and second (13) resilient members are operatively connected to said spool by gear train means (3, 4, 6, 7). The invention proves particularly advantageous in providing for resilient means which can exert a reduced return force during the rewinding of the belt for, preferably, a substantial portion of the rewinding thereof. Thus, the degree of comfort for the seat belt wearer is therefore increased during the rewinding of the belt about the spool.

24 Claims, 6 Drawing Sheets

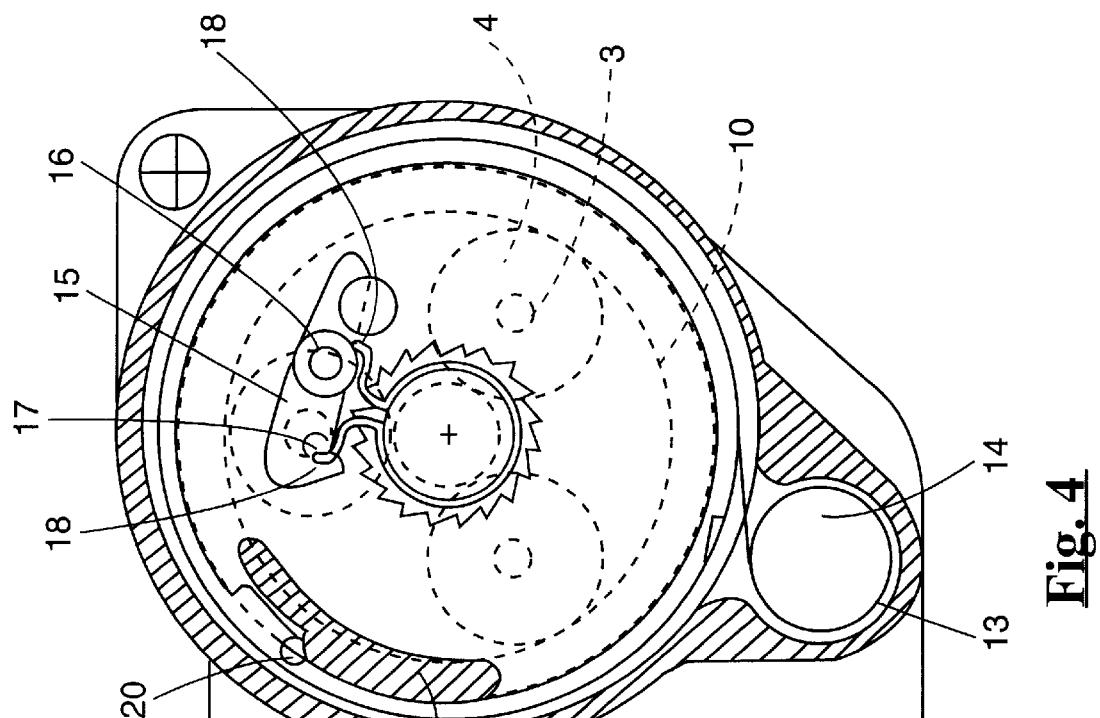
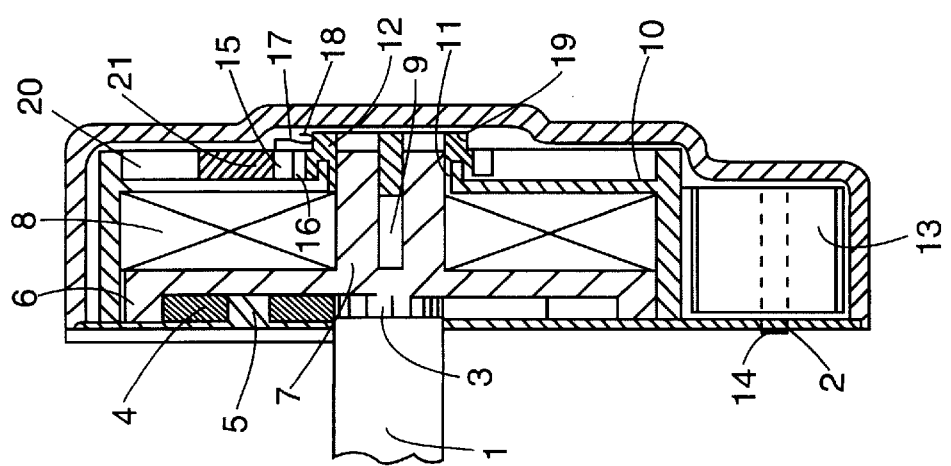

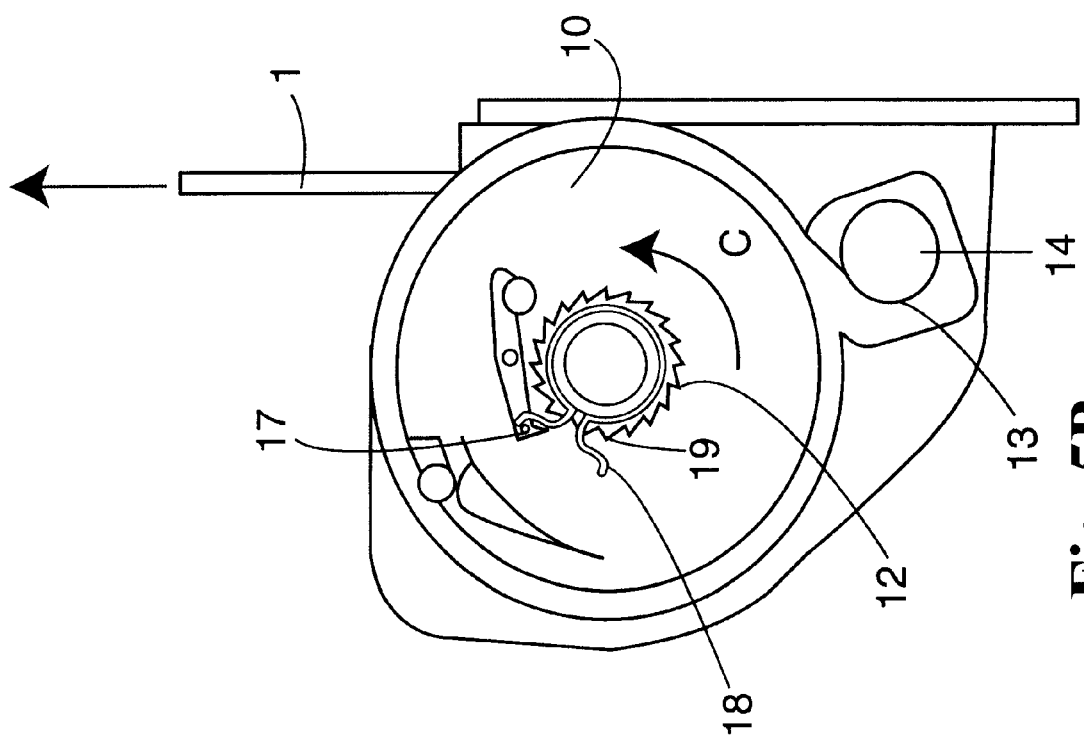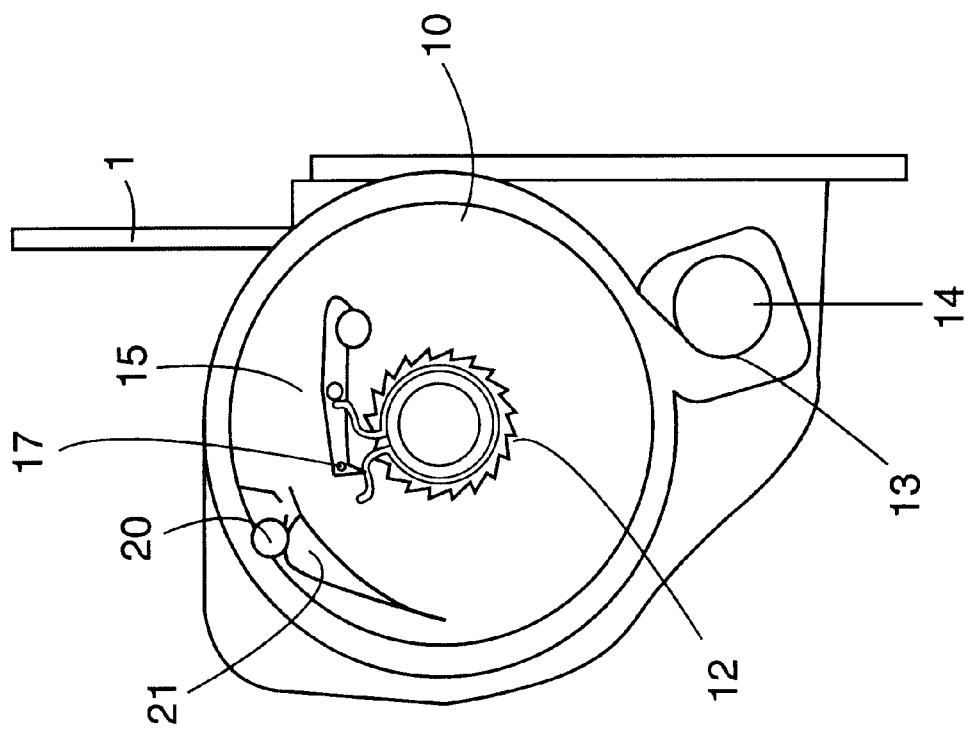

SEAT BELT MECHANISM

The present invention relates to a seat belt mechanism and, in particular, to a mechanism for providing increased comfort to the wearer.

With the commonly used retracting seat belt the spool of the seat belt is attached directly to a retraction spring. Each turn of the seat belt spool results in a 360° tightening of the retraction spring. One disadvantage of this arrangement is that the resistive force created by the retraction spring on the seat belt webbing increases as the seat belt webbing is unwound and as the retraction spring is wound. When the belt is in use, and a substantial length of webbing has been unwound from the spool, the resulting highly retractive force exerted by the spring can cause an uncomfortable pressure on the body of the wearer. Attempts to alleviate this problem by providing a so-called "comfort zone" associated with the seat belt mechanism have met with only limited success, primarily because the extent of such comfort zone is disadvantageously restricted.

The present invention seeks to provide for a seat belt mechanism having advantages over known mechanisms.

According to one aspect of the present invention there is provided a seat belt mechanism comprising a spool from which a seat belt is to be unwound, resilient means arranged to act on said spool to rewind said belt thereon, said resilient means comprising a first resilient member and a second resilient member arranged to exert a return force on said spool which is less than the return force exerted on said spool by said first resilient member, means inhibiting the return force of said first resilient means during initial rewinding of said spool so that said second resilient member provides the primary return force for the spool, and wherein said first and second resilient members are operatively connected to said spool by gear train means.

The invention proves particularly advantageous in providing for resilient means which can exert a reduced return force during the rewinding of the belt for, preferably, a substantial portion of the rewinding thereof. Thus, the degree of comfort for the seat belt wearer is therefore increased during the rewinding of the belt about the spool.

Preferably, said means for inhibiting the return force of said first resilient member is arranged to prevent the biasing operation of said first resilient member.

The return force to be exerted on the spool during the aforementioned substantial portion of the rewinding of the seat belt can be readily, and advantageously, arranged to comprise solely the return force exerted by the second resilient member.

In particular, the means for inhibiting the return force of the first resilient member can be arranged to simultaneously operatively connect said second resilient member to said spool.

Thus, a particularly compact, and relatively simple, structure can be achieved in the seat belt mechanism. Such features can be further enhanced by providing for common gear train means for the operative engagement of both the first and second resilient means with said spool.

Preferably, said mechanism includes first and second rotatable members wherein said first resilient member is operatively connected between said first and second rotatable members and said second resilient member is operatively connected between said second rotatable member and an anchor point of said mechanism.

An advantageously coaxial arrangement can then be provided for the mechanism of the present invention.

In this manner, said means for inhibiting the return force of said first resilient member can be arranged to connect said second rotatable member to said first rotatable member for rotation therewith and under the influence of said second resilient member.

Advantageously, said gear train means includes a sun and planet gear arrangement.

In particular, said sun gear is advantageously arranged to be driven by said spool and said planet gears are arranged to provide driving engagement to said resilient means.

According to a particular embodiment, said planet gears can be arranged to drive a ring gear member having teeth provided upon an inwardly facing annular surface thereof.

Preferably, said ring gear is operatively connected to said first rotatable member and, in a particularly advantageous embodiment of the present invention, said ring gear comprises said first rotatable member.

Preferably, said second rotatable member comprises an annular member and said first resilient member is arranged to be operatively connected between a spigot means of said first rotatable member and an inwardly facing annular surface of said second rotatable member.

Preferably, said means for operatively connecting said first and second rotatable members comprises a pawl and ratchet arrangement. In particular, said ratchet is advantageously connected for rotation with said first rotatable member and so can be mounted coaxially on the spigot means thereof and said pawl member can be mounted on said second rotatable member.

Preferably, the seat belt mechanism is provided with an engagement formation which is arranged for engaging said pawl means during the rotation of said second rotatable member so as to disconnect said pawl means from said ratchet member.

Further, there can advantageously be provided cam means arranged to retain the pawl means out of engagement with said ratchet means during selected portions of the angular rotation thereof.

In accordance with a particular embodiment of the present invention, said first and second resilient members comprise spring means which are advantageously in the form of coil springs wherein the second resilient member is disposed co-axially in relation to the first resilient member but at a location radially outwards thereof.

Preferably, the seat belt mechanism is located within a housing which can be arranged to provide the aforementioned engagement formation.

Such features enhance the compact and simple construction of the device without limiting the extent on the so-called comfort zone, i.e, the portion of retraction of the belt effected during inhibition of said first resilient member.

Preferably, said planet gear means are mounted on a bush arranged to have said spool extending therethrough for engagement with said sun gear.

Advantageously, said bush is also provided with an engagement formation for engaging one end of said second resilient member.

The cam means can comprise a cam wire which can be mounted on said ratchet means.

For particularly accurate operation of the present invention, means can be provided for limiting the angular rotation of said second rotatable member. In particular, stop means can be provided for this purpose and as part of the housing of the seat belt mechanism.

The seat belt mechanism of the invention has the advantage that it helps to eliminate the pressure exerted on the wearer of a seat belt. This has an associated advantage in that if the wearer can remain comfortable whilst benefitting from the safety of the seat belt, there will be less reluctance for people to wear seat belts.

The reduced tension on the wearer's body is known as the comfort zone. It is brought into effect because the retraction of the seat belt, i.e, the bias of the seat belt against being unwound, is controlled in the initial period of retraction not by the first biasing means, i.e, a retraction spring, but by the second biasing means, i.e, the comfort zone spring. Because the comfort zone spring offers less bias than the retraction spring, it is more comfortable for the wearer because, the pressure of the seat belt against the body arises from the comfort zone spring. The use of a gear train, and in particular a planetary gear train, increases the magnitude of the comfort zone above that available with a direct spool/spring interaction because a single rotation of the ring gear generates at least three rotations of the sun gear.

The invention is described further hereinafter by wave of example only, with reference to the accompanying drawings, in which:

Fig. 3 is a diagrammatic sectional view of the mechanism shown in FIGS. 1 and 2;

FIG. 4 is a part sectional plan view of the mechanism shown in FIGS. 1 and 2; and FIGS. 5A–5F are simplified plan views of the mechanism of FIGS. 1–4 showing the working relationship between various components of the mechanism and the operation thereof.

Figure 1:
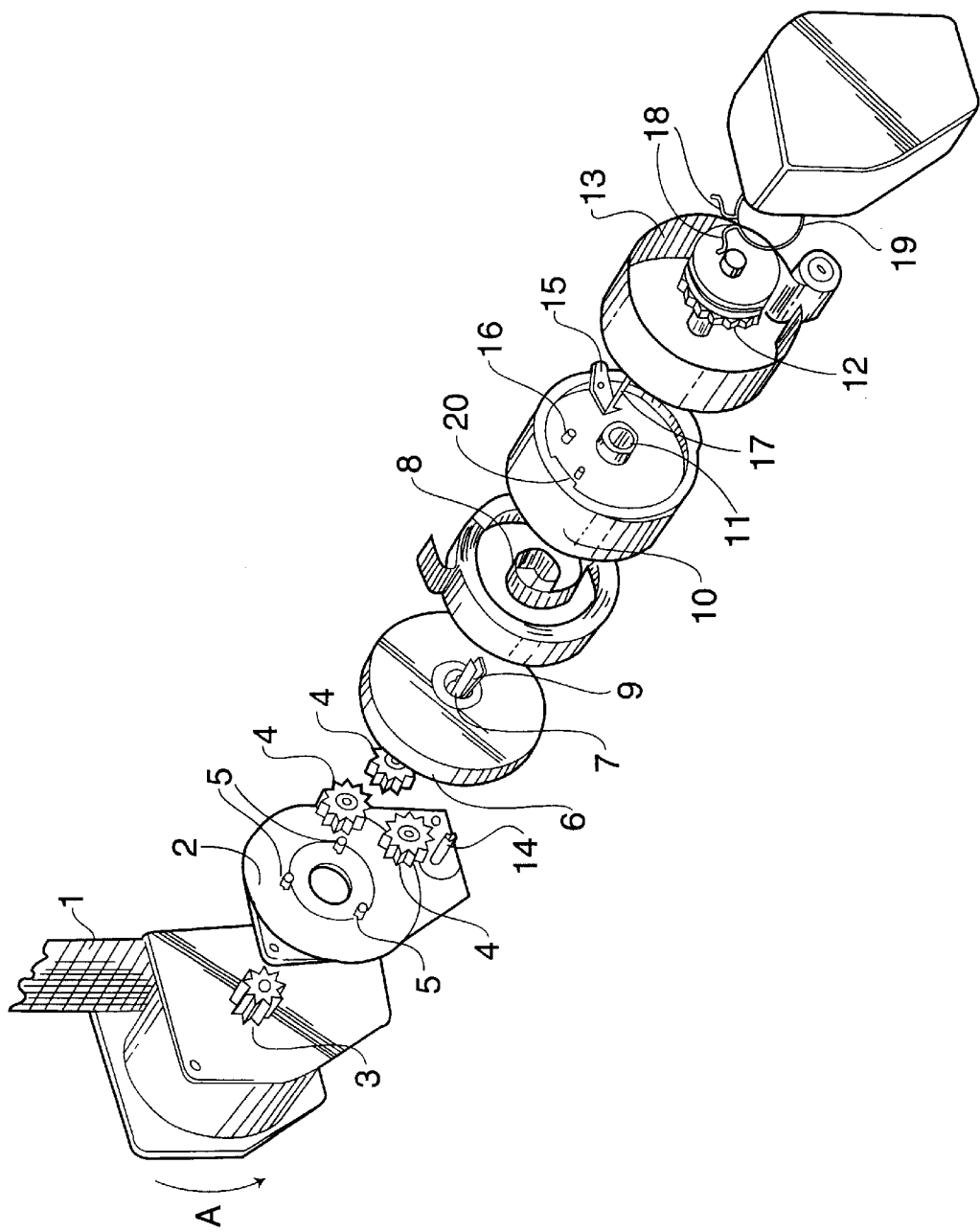
FIG. 1 is an exploded perspective view of a mechanism embodying the present invention.
Figure 2:
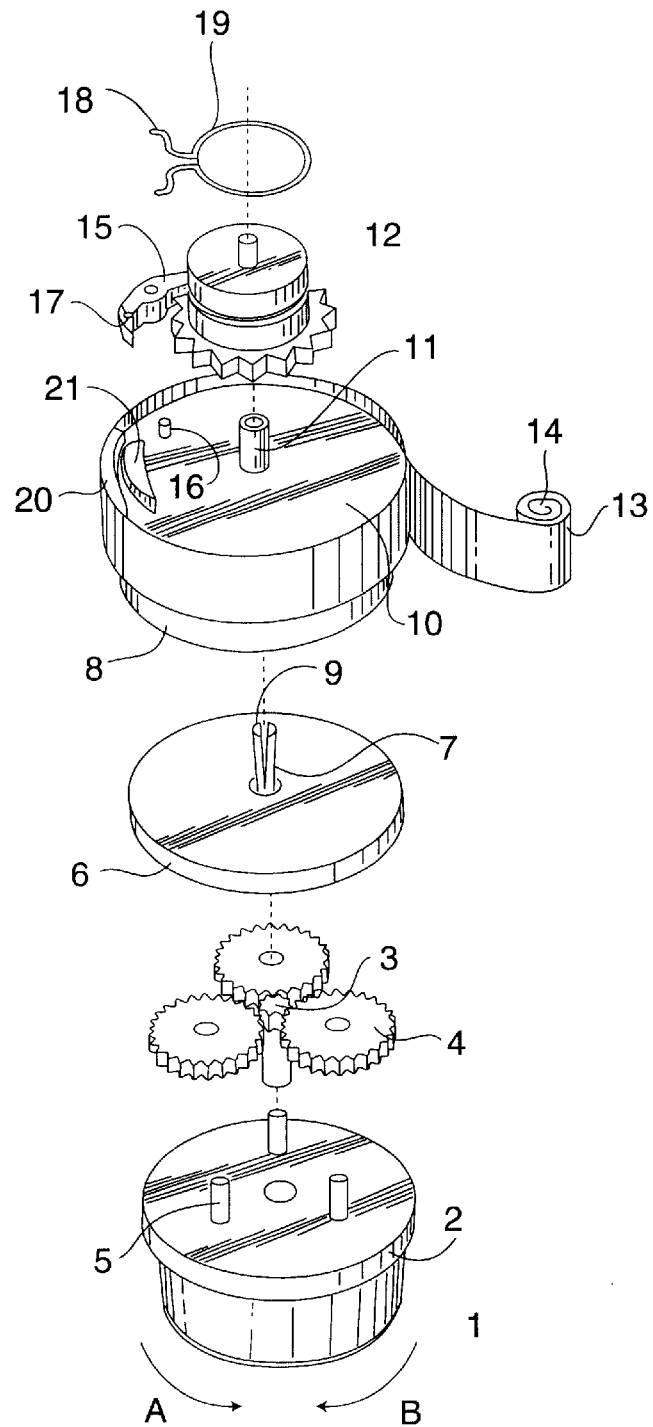
FIG. 2 is a further exploded view of the mechanism of FIG. 1.

Referring now to FIGS. 1 and 2, there are shown exploded views of one embodiment of the present invention and including a rotatable spool having seat belt webbing 1 wound thereon. The spool is mounted to a bush 2 such that a sun gear 3 is located centrally through an aperture in the bush 2 and away from the seat belt webbing 1. Three planetary gears 4 are rotatably mounted on the bush 2 by means of stub axles 5 and are positioned for driving engagement with the sun gear 3. A ring gear 6 is provided having a toothed inner surface with which it engages the planetary gears 4. A spigot 7 protrudes from the centre of the outer surface of the ring gear 6 and receives one end of a coiled retraction spring 8 in a slot 9 provided therein. The slot 9 in the spigot 7 also helps to locate and secure a ratchet member 12 on the spigot 7. The outer end of the coiled retraction spring 8 is arranged to be secured to the inner surface of a drum 10 which, when the mechanism is assembled, encapsulates the gearing system. The drum 10 has a central orifice 11 provided co-axially with the spool and through which the spigot 7 extends so as to connect to the ratchet member 12. A comfort spring 13 is secured at one end to the outside of the drum 10 and at its other end to a boss 14 which extends from the bush 2. The comfort spring is arranged to exert a bias seeking to wind around the boss 14 and so rotate the drum in a clockwise direction as shown in FIG. 1. A pawl 15 is pivotally mounted via a pin 16 on the end surface of drum 10 and has as a detent 17 thereon. The detent 17 is, when the mechanism is assembled, contactable by loops 18 of a cam wire 19 which is clipped co-axially adjacent the ratchet member 12. A stop 20 is mounted at the periphery of the end face of the drum 10 and, as described later, serves to prevent rotation of the drum under the influence of the coiled retraction spring 8 and the comfort spring 13 when the pawl 15 and the ratchet member 12 are disengaged. A ramp member 21 is also mounted on an inner surface of a cover member (only shown in FIG. 1) so as to engage the pawl 15 when the drum 10, and pass 15 mounted thereon, rotates to a predetermined position as will be described further below.

Operation of the mechanism is as follows. When the seat belt webbing 1 is pulled to extract the seat belt, the spool rotates in a direction indicated by Arrow A in FIGS. 1 and 2. This causes rotation of the sun gear 3 and corresponding (reduced) rotation of planet gears 4 and the ring gear 6. Rotation of the ring gear 6 causes the retraction spring 8 to tighten around the spigot 7. It should be recalled that the inner end of the retraction spring 8 is secured in the slot 9 of the spigot while the outer end of the retraction spring 8 is secured to an engagement formation (not shown) on the inner surface of the drum 10. Tightening of the retraction spring 8 occurs as the spigot 7 rotates relative to the drum 10. Rotation of the spigot 7 also causes rotation of ratchet member 12. As the ratchet member 12 begins to rotate, the detent 17 on the pawl 15 is located between the two loops 18 of the cam wire 19 and is brought into engagement with the ratchet member 12. The teeth of the ratchet member 12 are oriented such that, with the pawl 15 in engagement, rotation of the ratchet member 12 in the direction of Arrow A is still possible but rotation thereof in the direction of Arrow B, (see FIG. 2) i.e, the direction corresponding to seat belt retraction, is not. The cam wire 19 can slip on its mounting adjacent the ratchet member 12 such that the detent 17 on the pawl 15 is always between the looped ends 18 of cam wire 19 regardless of the degree of rotation of ratchet member 12. When seat belt extraction is completed, the retraction spring 8 cannot urge the seat belt back into a retracted position because the ring gear 6 is prevented from rotating, except in conjunction with drum 10, by the engagement of the pawl 15 and ratchet member 12. That is, due to the locking of the drum 10 and the spigot 7 by means of the ratchet 12 and pawl 15 engagement, the retraction spring 8 is rendered ineffective and rotation of the drum 10 and spigot 7 occurs as one unit under the driving force of the comfort spring 13 which, in turn, serves to retract the seat belt 1. Initial retraction of the seat belt is therefore controlled by the rotation in the direction of Arrow B of drum 10 under the influence of the comfort zone spring 13. The comfort zone provided by this arrangement lasts for the duration of an approximately 270° turn of the drum 10. The drum 10 rotates until the pawl 15 contacts the ramp member 21, which serves to pivot the pawl 15 thereby disengaging the pawl 15 from the ratchet member 12. The effect of the planetary gear system is that the ¾ turn of the drum 10 generates a comfort zone of some 3.3 turns in the seat belt spool. When the pawl 15 is disengaged, the ring gear 6 may then rotate freely under the influence of the retraction spring 8. As this occurs, one of the looped ends 18 of the cam wire 19 engages the detent pin 17 on the pawl 15 to maintain disengagement of the pawl 15 from the ratchet 12. Since some retraction of the seat belt 1 has already occurred under influence of the comfort spring 13, the retraction spring 8 only has minimal retraction to achieve. Once the seat belt 1 has returned to its "home" position, the residual bias in the retraction spring 8 serves to rotate the drum 10 relative to the (then stationary) spigot 7 and in a direction that unwinds (biases) the comfort spring 13 for future use.

Referring to FIG. 4, there is shown a ratchet member 12 around which is clipped the cam fire 19. The comfort zone spring 13 is shown connected at one end to the bush 2 via the boss 14 and at its other end to the outer surface of drum 10. The stop 20 engages the outer surface of the drum 10 to prevent movement thereof.

Operation of the illustrated embodiment of the present invention 17 now described with particular reference to FIGS. 5A to 5F:

FIG. 5A shows the mechanism at rest. That is, the stop 20 that rotates with the drum 10 engages behind the ramp member 21 extending from the cover of the mechanism so as to prevent rotation of the drum 10 in an anticlockwise manner according to FIG. 5A.

In FIG. 5B, the seat belt 1 is withdrawn from the spool in the manner indicated by the large Arrow and this causes the spool 7, and thus the ratchet 12 to rotate in the direction of Arrow C. Again, rotation of the drum IO is prevented by engagement of the stop 20 behind the ramp 21 and so the ratchet 12 rotates in the direction of Arrow C relative to the drum 10.

Figure 5D:
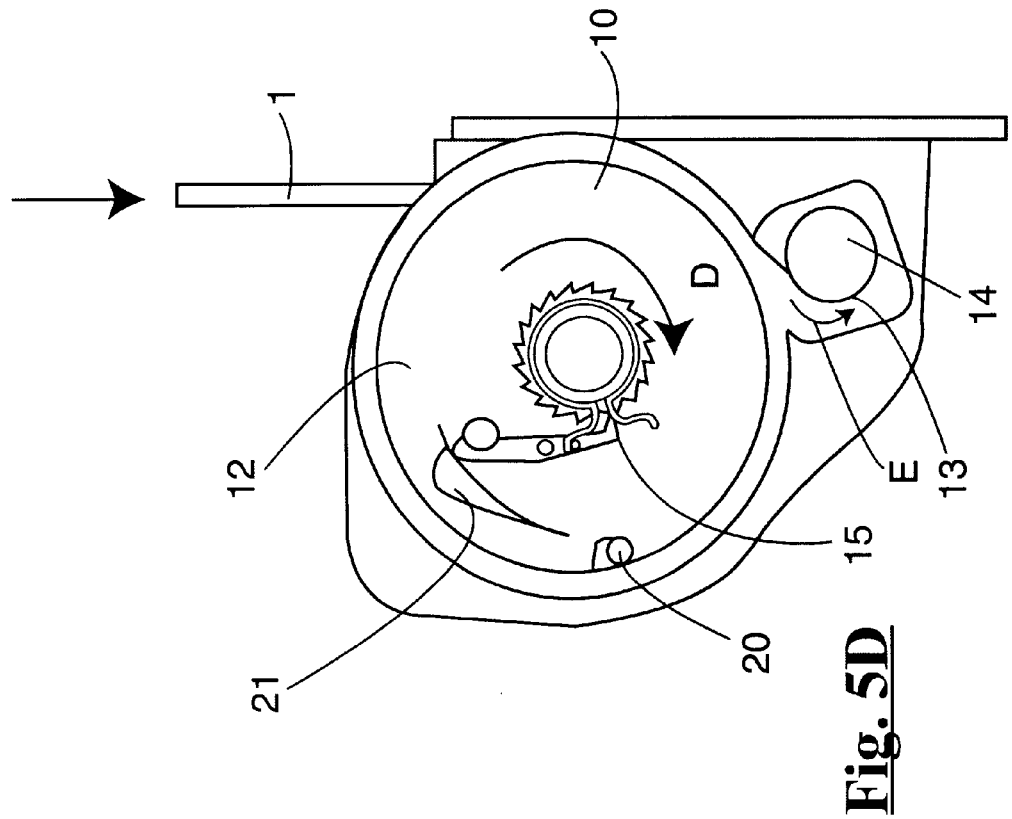
Figure 5C:
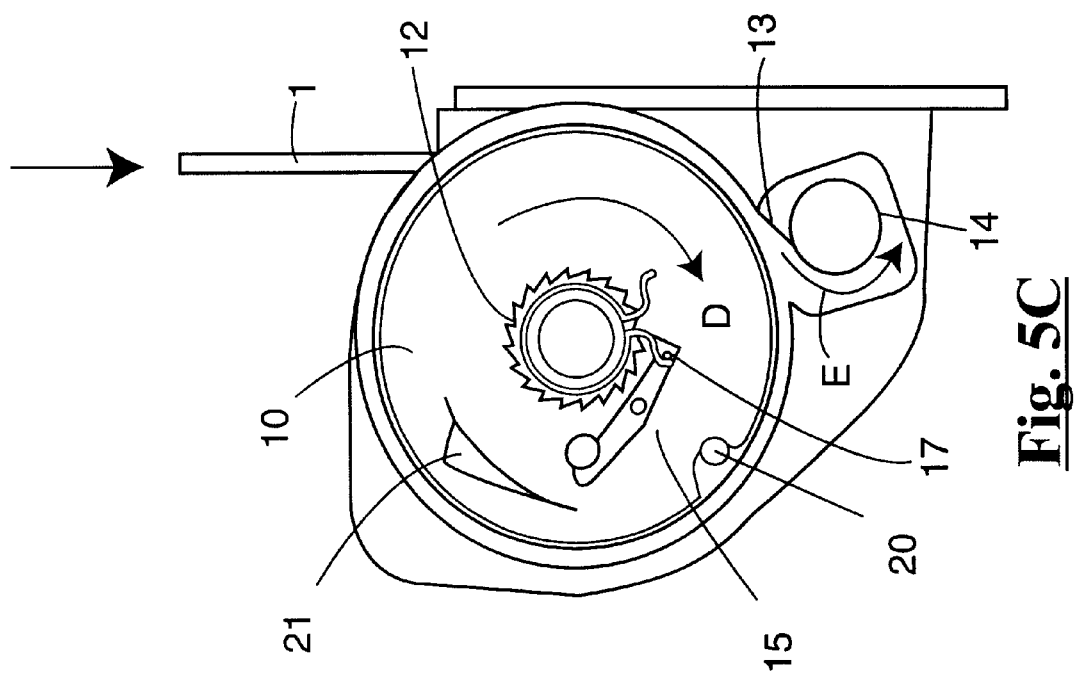

In FIG. 5C, pay-out of the seat belt 1 from the spool has been completed and the seat belt 1 begins to retract so as to be secured around the body of a vehicle driver/passenger. Rotation of the ratchet 12 in the direction of Arrow D therefore commences relative to the drum 10. However, this relative rotation is short-lived in view of the engagement that occurs between the pawl 15 and ratchet 12. The pawl 15 engages the ratchet 12 so as to prevent rotation thereof relative to the drum 10 so that the retraction spring 8 no longer serves to urge the seat belt 1 in the retracting direction illustrated in FIG. 5C because relative movement between the two members (i.e, the spool 7 and drum 10) between which the retraction spring 8 is operatively engaged, is no longer possible.

However, rotation of the drum 10 and ratchet 12 as a single unit continues in the direction of Arrow D shown in FIG. 5C so as to continue retraction of the seat belt 1. This continued retraction of the drum 10 and ratchet 12 as a single unit occurs under the influence of the comfort spring 13 which rotates the aforementioned single unit direction of Arrow D by virtue of its coiling around the spigot 14 in the direction of Arrow E also shown in FIG. 5C.

The retraction of the seat belt 1 in this manner continues until such time as the pawl member 15 comes into contact with the ramp member 21. The continued contact between the pawl member 15 and the ramp member 21 as the unitary arrangement of the drum 10 and ratchet 12 continues its rotation in the direction of Arrow D in FIG. 5D serves to lift the pin 17 of the pawl 15 out of engagement with the teeth of the ratchet member 12 so as to once again allow relative movement between the ratchet member 12 and the drum 10.

Further retraction of the seat belt 10 therefore occurs under the influence of the retraction spring 8 which still has to be substantially fully unwound since it has been involved only in a minor initial stage of the retraction of the seat belt 1. However, since a substantial amount of the seat belt retraction has already occurred, the retraction spring 8, on completing the seat belt retraction, still has elastic potential energy stored therein and, once the seat belt has returned to its "home" position, this stored elastic potential energy within the retraction spring 8 serves to rotate the drum in an anticlockwise direction such as that illustrated by Arrow F in FIG. 5F which continues until such time as the stop 20 is again held behind the ramp member 21 as initially illustrated in FIG. 5A. As of course will be appreciated, during the rotation of the drum 10 as illustrated by Arrow F in FIG. 5F, the (relatively weaker) comfort spring is unwound from its boss 14 and in the direction illustrated by Arrow G in FIG. 5F. The comfort spring is therefore re-tensioned so that, when next required, it is ready to rotate the unitary drum 10 and ratchet 12 arrangement in the direction of Arrow D in FIG. 5C so as to provide for the aforementioned comfort zone.

Figure 5F:
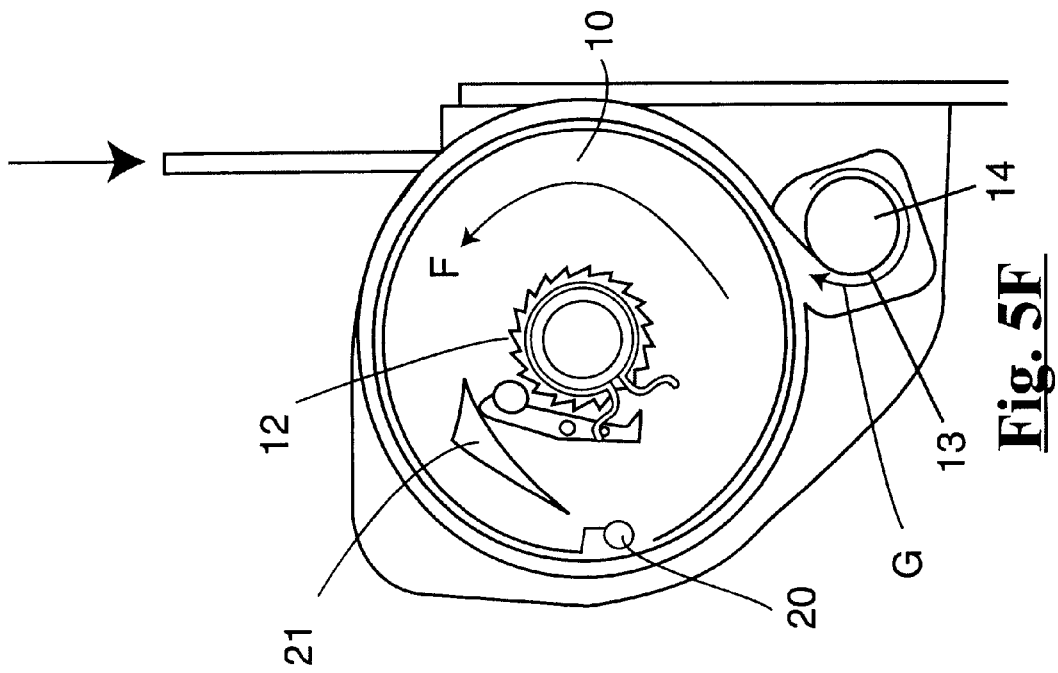
Figure 5E:
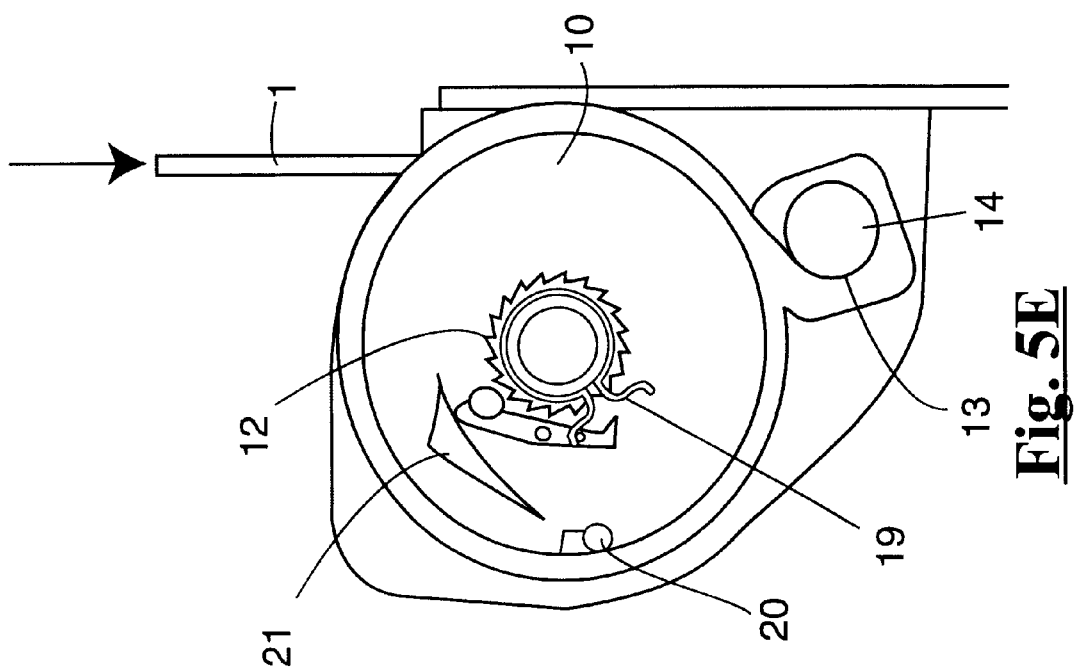

The cam wire 19 serves to retain the detent 17 of the pawl 15 out of engagement with the teeth of the ratchet 12 during rotation of the drum 10 in the direction of Arrow F in FIG. 5F.

Thus, it will be appreciated that a majority of the retraction of the seat belt 1 is driven by means of the weaker comfort spring 13 which therefore advantageously enhances comfort for the user.

Thus, it will be appreciated that the invention can advantageously provide for a seat belt mechanism comprising a rotatable spool receiving a seat belt webbing, a first sun gear mounted on the spool, one or more second planetary gears such that a single rotation of the ring gear causes at least three rotations of the sun gear and a single rotation of the sun gear causes a rotation of the ring gear of not more than 120°, a spigot on the ring gear, a drum encapsulating the gears and having a communicating orifice to allow connection of the spigot to a ratchet member situated outside the drum, a retraction coil spring connected at one end to the spigot and at its other end to the drum such that rotation of the ring gear within the drum causes winding or unwinding of the retractor spring, a comfort zone coil connected at one end to the drum and at its other end to a boss mounted outside the drum such that rotation of the drum causes winding or unwinding of the comfort zone spring; and pawl means mounted on the drum and engageable with the ratchet member to prevent rotation of the ring gear independently of the drum in a seat belt retraction direction when the pawl is engaged, means associated with the ratchet member for causing engagement of the pawl with the ratchet member when the ratchet member is rotated in a seat belt unwinding direction, means associated with the drum for causing disengagement of the pawl from the ratchet member after a part turn of the drum in a seat belt retraction direction and means associated with the ratchet member for maintaining disengagement of the pawl and ratchet member for the duration of a corresponding reverse part turn to that specified above and whereby unwinding of the seat belt generates, through a train of first, second and third gears, rotation of the ratchet member which in turn causes engagement of the pawl means, the ratchet member and pawl being arranged such that continued rotation of the ratchet member in a seat belt unwinding direction is possible despite the engagement of the pawl; retraction of the seat belt is initially controlled by the comfort zone spring which is unwound from the drum and onto the boss as the seat belt initially retracts, the engagement of the pawl and the ratchet member preventing drum-independent rotation of the ratchet member for the duration of the part turn of the drum in a seat belt retraction direction.

According to a particular advantage of the present invention, the planetary gear system allows the retraction spring as well as the comfort zone spring to operate through the gear train. Accordingly, a single winding of the spigot and associated winding or unwinding of the retraction spring generates an at least threefold effect on the rotation of the spool. Accordingly, less tension is required in the retraction spring to generate a given degree of seat belt retraction and the user is therefore provided with a secondary so-called comfort zone which advantageously can last the full length of the webbing extraction.

The invention is not limited by the number of planetary gears surrounding the sun gear. Accordingly, in one embodiment, a plurality of planetary gears are mounted at spaced regular intervals around the sun gear. In one such embodiment, three planetary gears are provided.

In a preferred embodiment, the ring gear has a toothed inner surface which engages with the planetary gear or gears and the number of teeth of the ring gear exceeds that of the or each planetary gear which in turn exceeds that of the sun gear.

In one convenient arrangement of the invention, the spigot protrudes from a central axis of the ring gear. This spigot is conveniently grooved to receive the one end of the retraction spring and one or more of the gears incorporates bearings to facilitate rotation thereof.

Conveniently, the inside surface of the drum is provided with one or more protruding members for securing the other end of the retraction spring.

In some embodiments of the invention it is preferable if at least one planetary gear is mounted on a bush which divides the seat belt spool from the remainder of the seat belt mechanism, the bush having an orifice for receiving the portion of the spool on which the sun gear is mounted. In this case, it is preferred if the boss receiving the end of the comfort zone spring is mounted on the bush.

This means for causing engagement of the pawl may comprise a cam wire connected to the ratchet member. This cam wire may be engageable with an upstanding pin on the pawl to create pivotal movement thereof when the ratchet member is rotated in a seat belt unwinding direction. Preferably, the means for causing disengagement of the pawl comprises a ramped member mounted in the region of the outer edge of the drum. Similarly, a cam wire may perform this function.

Importantly, the bias in favour of seat belt retraction by the comfort zone spring is less than that provided by the retraction spring.

I claim:

1. A seat belt mechanism comprising a spool from which a seat belt is to be unwound, resilient means arranged to act on said spool to rewind said belt thereon, said resilient means comprising a first resilient member and a second resilient member arranged to exert a return force on said spool which is less than the return force exerted on said spool by said first resilient member, means inhibiting the return force of said first resilient member during initial rewinding of said spool so that said second resilient member provides the primary return force for the spool, and wherein said first and second resilient members are operatively connected to said spool by gear train means and wherein the second resilient member is disposed diametrically about the first resilient member.

2. A mechanism as claimed in claim 1, wherein said means for inhibiting the return force of said first resilient member is arranged to prevent the biasing operation of said first resilient member.

3. A mechanism as claimed in claim 1, wherein the return force exerted on the spool during a substantial portion of the rewinding of the seat belt is arranged to comprise solely the return force exerted by the second resilient member.

4. A mechanism as claimed in claim 3, wherein the means for inhibiting the return force of the first resilient member is arranged to simultaneously operatively connect said second resilient member to said spool.

5. A mechanism as claimed in claim 1, and including first and second rotatable members wherein said first resilient member is operatively connected between said first and second rotatable members and said second resilient member is operatively connected between said second rotatable member and an anchor point of said mechanism.

6. A mechanism as claimed in claim 5, wherein the anchor point of the second resilient member is formed by a coiled portion of an end of the second resilient member and wherein a bush is provided with a cavity to receive the coiled portion.

7. A mechanism as claimed in claim 1 wherein after retraction of the seat belt under the influence of the second resilient member, the first resilient member serves to retention the second resilient member for future retraction.

8. A mechanism as claimed in claim 1 including common gear train means for the operative engagement of both the first and second resilient means with said spool.

9. A mechanism as claimed in claim 8, wherein said gear train means includes a sun and planet gear arrangement and wherein said sun gear is operatively driven by said spool and said planet gears are arranged to provide driving engagement to said first resilient member.

10. A seat belt mechanism comprising a spool from which a seat belt is to be unwound, resilient means arranged to act on said spool to rewind sand belt thereon, said resilient means comprising a first resilient member and a second resilient member arranged to exert a return force on said pool which is less than the returning force exerted on said spool by said first resilient member, means inhibiting the return force of said first resilient member during initial rewinding of said spool so that said second resilient member provides the primary return force for the spool, and wherein said first and second resilient members are operatively connected to said spool by gear train means;

first and second rotatable members wherein said first resilient member is operatively connected between said first and second rotatable member and said second resilient member is operatively connected between said second rotatable member and an anchor point of said mechanism;

wherein said means for inhibiting the return force of said first resilient member is arranged to connect said second rotatable member to said first rotatable member for rotation therewith and under the influence of said second resilient member.

11. A mechanism as claimed in claim 10, wherein the means arranged to connect said first and second rotatable members comprises a ratchet and pawl arrangement.

12. A mechanism as claimed in claim 11, wherein the ratchet is arranged to be operatively connected to one portion of the first resilient member and the pawl is arranged to be operatively connected to another portion of the first resilient member spaced from the said one portion.

13. A mechanism as claimed in claim 11 including cam means for retaining the pawl out of engagement with the ratchet responsive to the relative motion of the rotatable members.

14. A mechanism as claimed in claim 11, including gear train means comprising a sun gear rotatable with the spool and a planet gear arrangement, for the operative engagement of both the first and second resilient means, wherein said planet gears arrangement is arranged to drive a ring gear member having teeth provided upon an inwardly facing annular surface thereof.

15. A mechanism as claimed in claim 14, wherein said ring gear is operatively connected to said first rotatable member.

16. A mechanism as claimed in claim 15, wherein said ring gear comprises said first rotatable member.

17. A seat belt mechanism comprising a spool from which a seat belt is to be unwound, resilient means arranged to act on said spool to rewind said belt thereon, said resilient means comprising a first resilient member ad a second resilient member arranged to exert a return force on said spool which is less than the return force exerted on said spool by said first resilient member, means inhibiting the return force of said first resilient member during initial rewinding of said spool so that said second resilient member provides the primary return force for the spool, and wherein said first and second resilient members are operatively connected to said spool by gear train means;

first and second rotatable members wherein said first resilient member is operatively connected between said first and second rotatable members and said second resilient member is operatively connected between said second rotatable member and an anchor point of said mechanism;

wherein said second rotatable member comprises an annular member and said first resilient member is operatively connected between a spigot means of said first rotatable member and an inwardly facing annular surface of said second rotatable member.

18. A mechanism as claimed in claim 17, wherein a pawl and a ratchet arrangement operatively connect said first an second rotatable members.

19. A mechanism as claimed in claim 18, wherein said ratchet is connected for rotation with said first rotatable member and mounted coaxially on the spigot means thereof and wherein said pawl member is mounted on said second rotatable member.

20. A mechanism as claimed in claimed in claim 17, wherein the seat belt mechanism is provided with an engagement formation which is arranged for engaging said pawl during the rotation of said second rotatable member so as to disconnect said pawl from said ratchet member.

21. A mechanism as claimed in claim 18, and including cam means arranged to retain the pawl out of engagement with said ratchet means during selected portions of the angular rotation thereof.

22. A mechanism as claimed in claim 21, wherein said cam means comprises a cam wire mounted on said ratchet means.

23. A mechanism as claimed in claim 17, wherein said first and second resilient members comprise coil springs and wherein the second resilient member is disposed co-axially in relation to the first resilient member but at a location radially outwards thereof.

24. A seat belt mechanism comprising a spool from which a seat belt is to be unwound, resilient means arranged to act on said spool to rewind said belt thereon, said resilient means comprising a first resilient member and a second resilient member arranged to exert a return force on said spool which is less than the return force exerted on said spool by said first resilient member, means inhibiting the return force of said first resilient member during initial rewinding of said spool so that said second resilient member provides the primary return force for the spool, and wherein said first and second resilient members are operatively connected to said stool by gear train means;

first and second rotatable members wherein said first resilient member is operatively connected between said first and second rotatable members and said second resilient member is operatively connected between said second rotatable member and an anchor point of said mechanism;

including means for limiting the angular rotation of said second rotatable member.

* * * * *